(12) United States Patent
Choi et al.

(10) Patent No.: US 10,439,205 B2
(45) Date of Patent: Oct. 8, 2019

(54) NICKEL-BASED COMPOSITE OXIDE FOR LITHIUM SECONDARY BATTERY, AND LITHIUM SECONDARY BATTERY INCLUDING SAME

(71) Applicant: L&F CO., LTD., Daegu (KR)

(72) Inventors: Su An Choi, Gyeonggi-do (KR); Ji Sun An, Daegu (KR); Chang Min Choi, Gyeongsangnam-do (KR); Su Youn Kwong, Daegu (KR); Hyun Chul Jung, Daegu (KR); Sung Woo Cho, Gyeongsangnam-do (KR)

(73) Assignee: L&F CO., LTD., Daegu (KR)

( * ) Notice: Subject to any disclaimer, the term of this patent is extended or adjusted under 35 U.S.C. 154(b) by 321 days.

(21) Appl. No.: 15/506,824

(22) PCT Filed: Aug. 28, 2015

(86) PCT No.: PCT/KR2015/009080
§ 371 (c)(1),
(2) Date: Feb. 27, 2017

(87) PCT Pub. No.: WO2016/032289
PCT Pub. Date: Mar. 3, 2016

(65) Prior Publication Data
US 2017/0263920 A1 Sep. 14, 2017

(30) Foreign Application Priority Data
Aug. 29, 2014 (KR) .................. 10-2014-0114535

(51) Int. Cl.
*H01M 4/36* (2006.01)
*H01M 4/525* (2010.01)
(Continued)

(52) U.S. Cl.
CPC .......... *H01M 4/362* (2013.01); *H01M 4/485* (2013.01); *H01M 4/505* (2013.01); *H01M 4/525* (2013.01);
(Continued)

(58) Field of Classification Search
CPC .......... H01M 10/052; H01M 10/0525; H01M 2004/021; H01M 2004/028; H01M 4/362; H01M 4/485; H01M 4/505; H01M 4/525
See application file for complete search history.

(56) References Cited

U.S. PATENT DOCUMENTS

2014/0087267 A1* 3/2014 Zheng .................. H01M 4/583
429/231.8

FOREIGN PATENT DOCUMENTS

JP   2010-080394   8/2010
JP   2012-015110   1/2012
(Continued)

*Primary Examiner* — Carlos Barcena
(74) *Attorney, Agent, or Firm* — Adam Warwick Bell; Matthew Rupert Kaser (57) ABSTRACT

The present invention relates to a nickel-based composite oxide for a lithium secondary battery, and a lithium secondary battery including the same, and provides a nickel-based composite oxide for a lithium secondary battery, which comprises: a core part; and at least one tunnel connected from the inside of the core part to the outside thereof, wherein the tunnel has a diameter of 100 nm or larger, and the composite oxide further comprises coating layers located inside the tunnel and outside the core part.

15 Claims, 1 Drawing Sheet

(51) Int. Cl.
*H01M 10/0525* (2010.01)
*H01M 4/485* (2010.01)
*H01M 4/505* (2010.01)
H01M 10/052 (2010.01)
H01M 4/02 (2006.01)

(52) U.S. Cl.
CPC ...... *H01M 10/0525* (2013.01); *H01M 10/052* (2013.01); *H01M 2004/021* (2013.01); *H01M 2004/028* (2013.01)

(56) References Cited

FOREIGN PATENT DOCUMENTS

| | | |
|---|---|---|
| JP | 2013-120752 | 6/2013 |
| KR | 10-1998-0019103 | 8/1997 |
| KR | 10-2011-0079025 | 7/2011 |
| KR | 10-2013-0009739 | 1/2013 |
| KR | 10-2013-0076891 | 7/2013 |
| KR | 10-2014-0053378 | 5/2014 |

* cited by examiner

Figure

NICKEL-BASED COMPOSITE OXIDE FOR LITHIUM SECONDARY BATTERY, AND LITHIUM SECONDARY BATTERY INCLUDING SAME

RELATIONSHIP TO OTHER APPLICATIONS

The present application claims priority to and the benefit of International Application No.: PCT/KR2015/009080 which itself claims the benefit of Korean application 10-2014-0114535 files 29 Aug. 2014.

FIELD OF THE INVENTION

A nickel-based composite oxide for a lithium secondary battery and a lithium secondary battery including the same are disclosed.

BACKGROUND OF THE INVENTION

Conventionally, an attempt to improve inherent battery problems of power and cycle-life characteristics has been made through various coating and doping treatments of an NCM active material.

In addition, an active material needs to secure stable operation at a high voltage in order to be used for a vehicle and the like.

Various attempts to accomplish the above purposes by researchers have led to partly improving performance mainly through a surface treatment and substitution of a transition metal.

However, cycle-life and power characteristics of a final product are not still sufficient and have room for improvement.

Accordingly, technology for simultaneously performing both doping and coating, for example, coating of Al, B, and the like, and doping of Zr and Ti, has been recently practiced.

However, a large amount of residual Li, which is a main cause of deterioration of a cell, and collapse of primary particles after repeated cycles, still necessarily need to be improved.

BRIEF DESCRIPTION OF THE INVENTION

A nickel-based composite oxide for a lithium secondary battery and a lithium secondary battery including the same are disclosed. Specifically, the invention encompasses an NCM-based positive active material having improved power characteristics due to a coating layer by coating the inside of an active material to minimize residual lithium and having improved cycle-life characteristics by improving the collapse of primary particles.

BRIEF DESCRIPTION OF THE FIGURES

The meaning of the numbered elements in the figure is as follows:
001: Ni-based composite oxide core part
002: outside part of core part
003: tunnel having a diameter of 100 nm or greater and connecting the outside and inside of Ni-based composite oxide core part
004: coating layer
005: hollow space

DETAILED DESCRIPTION OF THE INVENTION

Technical Problem

Figure 1:
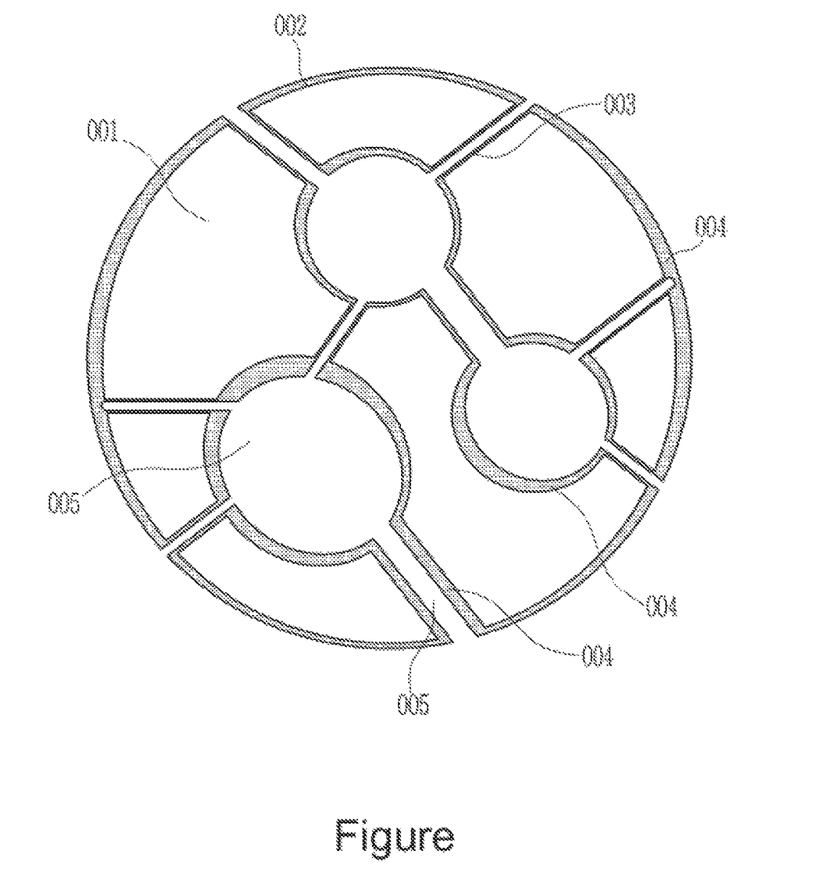
The FIG. is a cross-sectional view showing a nickel-based composite oxide having a coated particle inside and outside.

Accordingly, the present inventors developed an NCM-based positive active material having improved power characteristics due to a coating layer (e.g., an ion conductive layer) by coating the inside of an active material to minimize residual lithium and having improved cycle-life characteristics by improving the collapse of primary particles.

More specifically, the present invention relates to a technique for improving high rate capability and cycle-life characteristics of the NCM-based positive active material.

Technical Solution

In an embodiment of the present invention, a nickel-based composite oxide for a lithium secondary battery includes a core part, and at least one tunnel connected from the inside of the core part to the outside thereof, wherein the tunnel has a diameter of 100 nm or larger and the composite oxide further includes coating layers located inside the tunnel and outside the core part.

A hollow part disposed inside of the core part may be further included.

A diameter of the hollow part may be 100 nm or larger.

The hollow part may be connected with the tunnel at the inside of the core part.

The coating layer may be disposed inside of the hollow part.

More specifically, the diameter of the tunnel may be 100 nm to 2 μm.

Still more specifically, the diameter of the hollow part may be 100 nm to 90% or less of a diameter of the lithium composite oxide.

The coating layer may include one or more of B (boron), Al (aluminum), Si (silicon), W (tungsten), Ga (gallium), In (indium), and Sn (tin) as a coating element.

The coating element may include B (boron).

The coating element may include Al (aluminum).

The core part may include a compound represented by Chemical Formula 1.

$$Li_{1+x}Ni_aCo_bM_cM'_dO_2 \quad \text{[Chemical Formula 1]}$$

In Chemical Formula 1, x is ±0.05, 0.3≤a≤0.8, 0<b≤0.4, 0<c≤0.4, 0≤d≤0.05, M is one or more selected from Mn and Al, and M' is one or more selected from Ti, Zr, Mg, and Ca.

The coating layer may include a lithium compound produced from a reaction of a coating element in the coating layer with residual lithium of the core.

The coating layer may include $LiBO_2$, $LiB_3O_5$, $LiAlO_2$, or a combination thereof.

An amount of residual lithium in the nickel-based composite oxide may be 0.2% or less.

An amount of B distributed in the coating layer may be 0.3 wt % or less relative to a total amount of the nickel-based composite oxide.

An amount of Al distributed in the coating layer may be 0.5 wt % or less relative to a total amount of the nickel-based composite oxide.

Another embodiment of the present invention provides a lithium secondary battery including: a positive electrode including the nickel-based composite oxide for a lithium secondary battery according to the embodiment of the present invention; a negative electrode including a negative active material; and an electrolyte.

Advantageous Effects

Accordingly, the active material may have a large ion exchange area and a stronger bond among primary particles compared with a conventionally-coated active material.

Accordingly, high rate capability and cycle-life characteristics of the nickel-based composite oxide positive active material may be improved.

DESCRIPTION OF THE DRAWING

The FIG. is a cross-sectional view showing a nickel-based composite oxide having a coated particle inside and outside.

MODE FOR INVENTION

Hereinafter, embodiments of the present invention are described in detail. However, these embodiments are exemplary, and the present invention is not limited thereto but is defined by the scope of the claims.

A battery tends to be more rapidly deteriorated when repeatedly charged and discharged at a high voltage of greater than or equal to 4.5 V. This is because internal resistance of the battery is increased as destruction of primary particles is promoted by excessive expansion and contraction of a lattice.

In general, boron (B) is widely known as an additive promoting particle growth of a positive active material. When the boron (B) is excessively added, there may be a problem of generating large particles, agglomerating particles, producing minute particulates during the grinding due to excessive curing of the particles, and the like, but when added in an appropriate amount, a particle size may be appropriately designed.

In addition, the boron (B) may react with lithium on the surface of a positive electrode and form lithium boron oxide (LBO) which may play a role of an insulator suppressing an interface reaction with an electrolyte solution but increasing ion conductivity and thus improving power.

In an embodiment of the present invention, as described above, a coating layer may be further included inside of the hollow part, inside of the tunnel, and/or on an outer surface of the core part.

The coating layer may include a flux and other coating materials.

Specifically, the coating material (e.g., a flux material, boron, B) may inflow through a tunnel connecting the inside of the core part to the outside thereof.

The tunnel in general has a larger diameter than the interface of a primary particle having a dense interior, but the diameter may be in a range of 100 nm to 2 µm, which is large enough for the inflow of the coating material (e.g., a flux).

However, when the tunnel has a diameter of less than or equal to 100 nm, it is difficult for the coating material to inflow during the firing.

The inflow of the coating material (e.g., flux) may be generally performed at a lower temperature than a temperature for a heat treatment for manufacturing a positive electrode. The reason is that curing and overgrowing of particles may be prevented.

The inflow of the coating material (e.g., flux) is considered to grow primary particles and simultaneously fortify a bond among the primary particles.

When the boron (B) inflows along with an additional coating material such as aluminum (Al) and the like, distribution of the boron (B) along with the aluminum (Al) may be concentrated around the tunnel as seen through a cross-section analysis of the particles with EPMA and the like.

The reason is that the aluminum (Al) and the like inflow along with inflow of the boron (B) flux. Accordingly, when an external surface treatment element of a particle such as the aluminum (Al) and the like is coated inside the core part, an improvement effect through the coating may be much further increased compared with a compound coated only on the surface.

The positive active material according to an embodiment of the present invention may be usefully used in a positive electrode of a lithium secondary battery. The lithium secondary battery includes a negative electrode including a negative active material and an electrolyte along with the positive electrode.

The positive electrode is manufactured by mixing the positive active material according to one embodiment of the present invention, a conductive material, a binder, and a solvent to prepare a positive active material composition, then directly coating the positive active material composition on an aluminum current collector and drying it. Alternatively, the positive active material composition is coated on a separate support and then delaminated from the supporter. Then, the film is laminated on an aluminum current collector.

Herein, the conductive material may be carbon black, graphite, or a metal powder, and the binder may be a vinylidene fluoride/hexafluoropropylene copolymer, polyvinylidenefluoride, polyacrylonitrile, polymethylmethacrylate, polytetrafluoroethylene, and a mixture thereof. In addition, the solvent may be N-methylpyrrolidone, acetone, tetrahydrofuran, decane, and the like. Herein, the contents of the positive active material, the conductive material, the binder, and the solvent may be equivalent to those conventionally used in a lithium secondary battery.

The negative electrode is manufactured by mixing a negative active material, a binder, and a solvent to prepare a negative active material composition, and directly coating the negative active material composition on a copper current collector or laminating a negative active material film on a copper current collector after coating the negative active material composition on a separate support and delaminating the negative active material film, like the positive electrode. Herein, the negative active material composition may further include a conductive material if necessary.

The negative active material may be a material capable of intercalating/deintercalating lithium ions, and may include, for example, a lithium metal or a lithium alloy, coke, artificial graphite, natural graphite, an organic polymer compound combusted product, carbon fiber, and the like. In addition, the conductive material, the binder, and the solvent are the same as those used for the positive electrode.

The separator material includes polyethylene, polypropylene, and polyvinylidene fluoride, or a multi-layer thereof, and it is used in a lithium rechargeable battery, and for example is a polyethylene/polypropylene double-layered separator, a polyethylene/polypropylene/polyethylene triple-layered separator, or a polypropylene/polyethylene/polypropylene triple-layered separator.

The electrolyte charged for a lithium secondary battery may include a non-aqueous electrolyte, a solid electrolyte, or the like, in which a lithium salt is dissolved.

The solvent for a non-aqueous electrolyte includes, but is not limited to: cyclic carbonates such as ethylene carbonate, propylene carbonate, butylene carbonate, vinylene carbonate, and the like; linear carbonates such as dimethyl carbonate, methylethyl carbonate, diethyl carbonate, and the like; esters such as methyl acetate, ethyl acetate, acetic acid propyl, methyl propionate, ethyl propionate, γ-butyrolactone, and the like; ethers such as 1,2-dimethoxyethane, 1,2-diethoxyethane, tetrahydrofuran, 1,2-dioxane, 2-methyltetrahydrofuran, and the like; nitriles such as acetonitrile and the like; amides such as dimethylformamide and the like; and the like. They may be used alone or in combination. In particular, the solvent may be a mixed solvent of a cyclic carbonate and a linear carbonate.

The electrolyte may include a gel-type polymer electrolyte prepared by impregnating an electrolyte solution in a polymer electrolyte such as polyethylene oxide, polyacrylonitrile, and the like, or an inorganic solid electrolyte such as LiI and $Li_3N$, but is not limited thereto.

The lithium salt includes at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI.

The following examples illustrate the present invention in more detail. However, it is understood that the present invention is not limited by these examples.

EXAMPLE 1

A nickel composite metal hydroxide having a hollow tunnel structure having a diameter of greater than or equal to 100 nm and connecting the inside and outside of a core part (at a mole ratio of Ni:Co:Mn=38:29:33), a $ZrO_2$ powder, and a $TiO_2$ powder were dry-mixed at a weight ratio of 100:0.2:0.3 with a blender.

After uniformly attaching the $ZrO_2$ powder and the $TiO_2$ powder on the surface of the composite transition metal hydroxide particles, 1.05 mol of $Li_2CO_3$ was dry-mixed with 1 mol of the composite transition metal hydroxide having the $ZrO_2$ powder and the $TiO_2$ powder uniformly attached on the surface at a ratio of Li/Metal=1.05.

The dry-mixed powder was heat-treated at 890° C. for 8 hours to manufacture a lithium composite compound.

In addition, the lithium composite compound was dry-mixed with a $B_2O_3$ powder at a weight ratio of 100:0.2, so that the $B_2O_3$ powder might be uniformly attached on the surface of the lithium composite compound.

Subsequently, the dry-mixed lithium composite compound was heat-treated at 400° C. for 6 hours to obtain a positive active material in which the inside of the core of the lithium composite compound through the tunnel as well as the surface was coated with the boron (B) compound.

EXAMPLE 2

A positive active material coated with the B (boron) compound inside and on the surface was manufactured according to the same method as Example 1, except for using a Ni composite metal hydroxide having a mole ratio of Ni:Co:Mn=60:20:20.

EXAMPLE 3

A positive active material coated with the B (boron) compound inside and on the surface was manufactured according to the same method as Example 1, except for using a Ni composite metal hydroxide having a mole ratio of Ni:Co:Mn=70:15:15.

EXAMPLE 4

A positive active material coated with the B (boron) compound inside and on the surface was manufactured according to the same method as Example 1, except for using a Ni composite metal hydroxide having a mole ratio of Ni:Co:Mn=80:10:10.

EXAMPLE 5

A nickel composite metal hydroxide having a hollow tunnel structure having a diameter of greater than or equal to 100 nm and connecting the inside with the outside of a core part (at a mole ratio of Ni:Co:Mn=38:29:33) was dry-mixed with a $ZrO_2$ powder and a $TiO_2$ powder at a weight ratio of 100:0.2:0.3 with a blender.

After uniformly attaching the $ZrO_2$ powder and the $TiO_2$ powder on the surface of particles of the composite transition metal hydroxide, 1.05 mol of $Li_2CO_3$ was dry-mixed with 1 mol of the composite transition metal hydroxide attached with the $ZrO_2$ powder and the $TiO_2$ powder on the surface at a ratio of Li/Metal=1.05.

The dry-mixed powder was heat-treated at 890° C. for 8 hours to manufacture a lithium composite compound.

In addition, the lithium composite compound was mixed with $Al(OH)_3$ powder and $B_2O_3$ powder at a weight ratio of 100:0.4:0.2, so that the $Al(OH)_3$ powder and the $B_2O_3$ powder might be uniformly attached on the surface of the lithium composite compound.

Then, the dry-mixed lithium composite compound was heat-treated at 400° C. for 6 hours to obtain a positive active material coated with aluminum (Al) and boron (B) compounds inside of the core through the hollow tunnel as well as on the surface.

EXAMPLE 6

A positive active material coated with Al (aluminum) and B (boron) compounds inside and on the surface was manufactured according to the same method as Example 5, except for using a Ni composite metal hydroxide having a mole ratio of Ni:Co:Mn=60:20:20.

EXAMPLE 7

A positive active material coated with Al (aluminum) and B (boron) compounds inside and on the surface was manufactured according to the same method as Example 5, except for using a Ni composite metal hydroxide having a mole ratio of Ni:Co:Mn=70:15:15.

EXAMPLE 8

A positive active material coated with Al (aluminum) and B (boron) compounds inside and on the surface was manufactured according to the same method as Example 5, except for using a Ni composite metal hydroxide having a mole ratio of Ni:Co:Mn=80:10:10.

Comparative Example 1

A nickel composite metal hydroxide having a hollow tunnel structure having a diameter of greater than or equal to 100 nm and connecting the inside and outside of a core part (at a mole ratio of Ni:Co:Mn=38:29:33) was dry-mixed with $ZrO_2$ powder and $TiO_2$ powder at a weight ratio of 100:0.2:0.3 with a blender.

After uniformly attaching the $ZrO_2$ powder and the $TiO_2$ powder on the surface of particles of the composite transition metal hydroxide, 1.05 mol of $Li_2CO_3$ was dry-mixed with 1 mol of the composite transition metal hydroxide having the $ZrO_2$ powder and the $TiO_2$ powder on the surface at a ratio of Li/Metal=1.05.

The dry-mixed powder was heat-treated at 890° C. for 8 hours to manufacture a lithium composite compound.

Subsequently, the lithium composite compound was neither mixed nor heat-treated with the aluminum and boron compounds.

Comparative Example 2

A Ni composite metal hydroxide having a dense inside structure (at a mole ratio of Ni:Co:Mn=38:29:33) was dry-mixed with dispersed $ZrO_2$ powder and $TiO_2$ powder at a weight ratio of 100:0.2:0.3 with a blender, so that the $ZrO_2$ powder and the $TiO_2$ powder might be uniformly attached on the surface of particles of the composite transition metal hydroxide.

Then, 1.05 mol of $Li_2CO_3$ was dry-mixed with 1 mol of the composite transition metal hydroxide having the $ZrO_2$ powder and the $TiO_2$ powder uniformly attached on the surface at a ratio of Li/Metal=1.05. The dry-mixed powder was heat-treated at 890° C. for 8 hours to manufacture a lithium composite compound.

The lithium composite compound was neither mixed nor heat-treated with aluminum and boron compounds.

Comparative Example 3

A Ni composite metal hydroxide having a dense inside structure (at a mole ratio of Ni:Co:Mn=38:29:33) was mixed with dispersed $ZrO_2$ powder and $TiO_2$ powder at a weight ratio of 100:0.2:0.3 with a blender, so that the $ZrO_2$ powder and the $TiO_2$ powder might be uniformly attached on the surface of particles of the composite transition metal hydroxide.

Subsequently, 1.05 mol of $Li_2CO_3$ was dry-mixed with 1 mol of the composite transition metal hydroxide having the $ZrO_2$ powder and the $TiO_2$ powder uniformly attached on the surface at a ratio of Li/Metal=1.05. The dry-mixed powder was heat-treated at 890° C. for 8 hours to manufacture a lithium composite compound.

In addition, the lithium composite compound was dry-mixed with the lithium composite compound and $B_2O_3$ powder at a weight ratio of 100:0.2 to uniformly attach the $B_2O_3$ powder on the surface of the lithium composite compound.

Then, the dry-mixed lithium composite compound was heat-treated at 400° C. for 6 hours to obtain a positive active material coated with the B (boron) compound on the surface.

Comparative Example 4

An NCM composite metal hydroxide having a dense inside structure (at a mole ratio of Ni:Co:Mn=38:29:33) was mixed with dispersed $ZrO_2$ powder and $TiO_2$ powder at a weight ratio of 100:0.2:0.3 with a blender to uniformly attach the $ZrO_2$ powder and the $TiO_2$ powder on the surface of particles of the composite transition metal hydroxide.

Subsequently, 1.05 mol of $Li_2CO_3$ was mixed with 1 mol of the composite transition metal hydroxide having the $ZrO_2$ powder and the $TiO_2$ powder uniformly attached on the surface at a ratio of Li/Metal=1.05. The dry-mixed powder was heat-treated at 890° C. for 8 hours to manufacture a lithium composite compound.

In addition, the lithium composite compound was dry-mixed with $Al(OH)_3$ powder and $B_2O_3$ powder at a weight ratio of 100:0.4:0.2 to uniformly attach the $Al(OH)_3$ powder and the $B_2O_3$ powder on the surface of the lithium composite compound.

Subsequently, the dry-mixed lithium composite compound was heat-treated at 400° C. for 6 hours to obtain a positive active material coated with Al (aluminum) and B (boron) compounds on the surface.

Comparative Example 5

A positive active material was manufactured according to the same method as Comparative Example 1, except for using a Ni composite metal hydroxide having a mole ratio of Ni:Co:Mn=60:20:20.

Comparative Example 6

A positive active material was manufactured according to the same method as Comparative Example 2, except for using a Ni composite metal hydroxide having a mole ratio of Ni:Co:Mn=60:20:20.

Comparative Example 7

A positive active material was manufactured according to the same method as Comparative Example 3, except for using a Ni composite metal hydroxide having a mole ratio of Ni:Co:Mn=60:20:20.

COMPARATIVE EXAMPLE 8

A positive active material was manufactured according to the same method as Comparative Example 4, except for using a Ni composite metal hydroxide having a mole ratio of Ni:Co:Mn=60:20:20.

Comparative Example 9

A positive active material was manufactured according to the same method as Comparative Example 1, except for using a Ni composite metal hydroxide having a mole ratio of Ni:Co:Mn=70:15:15.

Comparative Example 10

A positive active material was manufactured according to the same method as Comparative Example 2, except for using a Ni composite metal hydroxide having a mole ratio of Ni:Co:Mn=70:15:15.

Comparative Example 11

A positive active material was manufactured according to the same method as Comparative Example 3, except for using a Ni composite metal hydroxide having a mole ratio of Ni:Co:Mn=70:15:15.

Comparative Example 12

A positive active material was manufactured according to the same method as Comparative Example 4, except for using a Ni composite metal hydroxide having a mole ratio of Ni:Co:Mn=70:15:15.

Comparative Example 13

A positive active material was manufactured according to the same method as Comparative Example 1, except for using a Ni composite metal hydroxide having a mole ratio of Ni:Co:Mn=80:10:10.

Comparative Example 14

A positive active material was manufactured according to the same method as Comparative Example 2, except for using a Ni composite metal hydroxide having a mole ratio of Ni:Co:Mn=80:10:10.

Comparative Example 15

A positive active material was manufactured according to the same method as Comparative Example 3, except for using a Ni composite metal hydroxide having a mole ratio of Ni:Co:Mn=80:10:10.

Comparative Example 16

A positive active material was manufactured according to the same method as Comparative Example 4, except for using a Ni composite metal hydroxide having a mole ratio of Ni:Co:Mn=80:10:10.

Experimental Example 1

Measurement of Residual Li of Active Material

An amount of residual lithium in the positive active materials according to the examples and comparative examples was measured by separately measuring an amount of each compound including the residual Li (e.g., LiOH or $Li_2CO_3$) in a potentiometric neutralization titration method and calculating a total amount of Li (total lithium (TTL)).

The calculation was performed according to Calculation Equation 1.

$$\text{TTL (Total Li)} = \text{LiOH analyzed value (\%)} * Li/LiOH + Li_2CO_3 \text{ analyzed value (\%)} * 2Li/Li_2CO_3 = \text{LiOH analyzed value (\%)} * 0.29 + Li_2CO_3 \text{ analyzed value (\%)} * 0.188 \quad [\text{Calculation Equation 1}]$$

TABLE 1

| | | Content of coating element (wt %) | | Inside structure of core | LiOH analyzed value (%) | $Li_2CO_3$ analyzed value (%) | TTL (%) | Decrease ratio of residual Li (%) |
|---|---|---|---|---|---|---|---|---|
| | Ni:Co:Mn | Al | B | | | | | |
| Ex. 1 | 38:29:33 | 0 | 0.2 | hollow | 0.068 | 0.158 | 0.048 | 11.92 |
| Ex. 5 | 38:29:33 | 0.4 | 0.2 | hollow | 0.071 | 0.160 | 0.051 | 6.97 |
| Comp. Ex. 1 | 38:29:33 | 0 | 0 | hollow | 0.099 | 0.137 | 0.054 | — |

※Decrease ratio: (TTL after coating of Al and B − TTL before coating)/TTL before coating <Comparison of contents of residual Li of a tunnel-structured Ni composite oxide before and after coating—a composition of 38:29:33>

TABLE 2

| | | Content of coating element (wt %) | | Inside structure of core | LiOH analyzed value (%) | $Li_2CO_3$ analyzed value (%) | TTL (%) | Decrease ratio of residual Li (%) |
|---|---|---|---|---|---|---|---|---|
| | Ni:Co:Mn | Al | B | | | | | |
| Ex. 2 | 60:20:20 | 0 | 0.2 | hollow | 0.265 | 0.242 | 0.122 | 20.26 |
| Ex. 6 | 60:20:20 | 0.4 | 0.2 | hollow | 0.267 | 0.228 | 0.120 | 21.57 |
| Comp. Ex. 5 | 60:20:20 | 0 | 0 | hollow | 0.201 | 0.504 | 0.153 | — |

<Comparison of contents of residual Li of a tunnel structured Ni composite oxide before and after coating—a composition of 60:20:20>

TABLE 3

| | | Content of coating element (wt %) | | Inside structure of core | LiOH analyzed value (%) | $Li_2CO_3$ analyzed value (%) | TTL (%) | Decrease ratio of residual Li (%) |
|---|---|---|---|---|---|---|---|---|
| | Ni:Co:Mn | Al | B | | | | | |
| Ex. 3 | 70:15:15 | 0 | 0.2 | hollow | 0.243 | 0.291 | 0.125 | 55.17 |
| Ex. 7 | 70:15:15 | 0.4 | 0.2 | hollow | 0.233 | 0.353 | 0.135 | 51.63 |
| Comp. Ex. 9 | 70:15:15 | 0 | 0 | hollow | 0.485 | 0.737 | 0.279 | — |

<Comparison of contents of residual Li of a tunnel structured Ni composite oxide before and after coating—a composition of 70:15:15>

TABLE 4

| | Ni:Co:Mn | Content of coating element (wt %) Al | B | Inside structure of core | LiOH analyzed value (%) | Li$_2$CO$_3$ analyzed value (%) | TTL (%) | Decrease ratio of residual Li (%) |
|---|---|---|---|---|---|---|---|---|
| Ex. 4 | 80:10:10 | 0 | 0.2 | hollow | 0.246 | 0.301 | 0.128 | 57.59 |
| Ex. 8 | 80:10:10 | 0.4 | 0.2 | hollow | 0.345 | 0.423 | 0.180 | 40.47 |
| Comp. Ex. 3 | 80:10:10 | 0 | 0 | hollow | 0.432 | 0.584 | 0.235 | — |

<Comparison of contents of residual Li of a tunnel structured Ni composite oxide before and after coating—a composition of 80:10:10>

TABLE 5

| | Ni:Co:Mn | Content of coating element (wt %) Al | B | Inside structure of core | Decrease ratio of residual Li (%) |
|---|---|---|---|---|---|
| Ex. 1 | 38:29:33 | 0 | 0.2 | hollow | 11.92 |
| Ex. 5 | 38:29:33 | 0.4 | 0.2 | hollow | 6.97 |
| Comp. Ex. 1 | 38:29:33 | 0 | 0 | hollow | — |
| Comp. Ex. 2 | 38:29:33 | 0 | 0 | dense | — |
| Comp. Ex. 3 | 38:29:33 | 0 | 0.2 | dense | 7.32 |
| Comp. Ex. 4 | 38:29:33 | 0.4 | 0.2 | dense | 1.85 |

<Comparison of decrease ratios of residual Li of 38:29:33 Ni composite oxide>

TABLE 6

| | Ni:Co:Mn | Content of coating element (wt %) Al | B | Inside structure of core | Decrease ratio of residual Li (%) |
|---|---|---|---|---|---|
| Ex. 2 | 60:20:20 | 0 | 0.2 | hollow | 20.26 |
| Ex. 6 | 60:20:20 | 0.4 | 0.2 | hollow | 21.57 |
| Comp. Ex. 5 | 60:20:20 | 0 | 0 | hollow | — |
| Comp. Ex. 6 | 60:20:20 | 0 | 0 | dense | — |
| Comp. Ex. 7 | 60:20:20 | 0 | 0.2 | dense | 8.51 |
| Comp. Ex. 8 | 60:20:20 | 0.4 | 0.2 | dense | 4.26 |

<Comparison of decrease ratios of residual Li of 60:20:20 Ni composite oxide>

TABLE 7

| | Ni:Co:Mn | Content of coating element (wt %) Al | B | Inside structure of core | Decrease ratio of residual Li (%) |
|---|---|---|---|---|---|
| Ex. 3 | 70:15:15 | 0 | 0.2 | hollow | 55.17 |
| Ex. 7 | 70:15:15 | 0.4 | 0.2 | hollow | 51.63 |
| Comp. Ex. 9 | 70:15:15 | 0 | 0 | hollow | — |
| Comp. Ex. 10 | 70:15:15 | 0 | 0 | dense | — |
| Comp. Ex. 11 | 70:15:15 | 0 | 0.2 | dense | 16.18 |
| Comp. Ex. 12 | 70:15:15 | 0.4 | 0.2 | dense | 0 |

<Comparison of decrease ratios of residual Li of 70:15:15 Ni composite oxide>

TABLE 8

| | Ni:Co:Mn | Content of coating element (wt %) Al | B | Inside structure of core | Decrease ratio of residual Li (%) |
|---|---|---|---|---|---|
| Ex. 4 | 80:10:10 | 0 | 0.2 | hollow | 57.59 |
| Ex. 8 | 80:10:10 | 0.4 | 0.2 | hollow | 40.47 |
| Comp. Ex. 13 | 80:10:10 | 0 | 0 | hollow | — |
| Comp. Ex. 14 | 80:10:10 | 0 | 0 | dense | — |
| Comp. Ex. 15 | 80:10:10 | 0 | 0.2 | dense | 20.51 |
| Comp. Ex. 16 | 80:10:10 | 0.4 | 0.2 | dense | 12.53 |

<Comparison of decrease ratios of residual Li of 80:10:10 Ni composite oxide>

Referring to the results, nickel composite oxide having a core having a hollow inside structure showed less residual Li when coated with Al and B tan when not coated with Al and B even though a ratio of Ni:Co:Mn is changed.

In addition, as shown in Tables 5 to 8, nickel composite oxides having a core having a hollow inside structure showed a higher Li decrease ratio than nickel composite oxides having a core having a dense inside structure.

Referring to the results of Tables 5 to 8, residual Li in the nickel composite oxide having a hollow structure were more linked with a coating element of Al and B, and accordingly, a coating layer had a larger area. The reason is that the coating layer was formed inside of the core through a tunnel of the hollow structure as well as the surface of particles.

Manufacture of Coin Cell 95 wt % of each positive active material according to the examples and comparative examples, 2.5 wt % of carbon black as a conductive agent, and 2.5 wt % of PVDF as a binder were added to 5.0 wt % of N-methyl-2-pyrrolidone (NMP) as a solvent to prepare a positive electrode slurry.

The positive electrode slurry was coated on a 20 to 40 μm-thick aluminum (Al) thin film as a positive electrode current collector, and then vacuum-dried and roll-pressed to manufacture a positive electrode.

As for a negative electrode, Li metal was used.

The positive electrode, the Li metal as a counter electrode, and 1.15 M LiPF6EC:DMC (1:1 vol %) as an electrolyte solution were used to manufacture a coin type half-cell.

Experimental Example 2

Evaluation of Cell Characteristics

Tables 9 to 12 show high rate characteristics and cycle-life characteristics of the cells according to the examples and comparative examples at 45° C. and 4.5 V.

TABLE 9

| | Ni:Co:Mn | Decrease ratio of residual Li (%) | High rate capability 3 C/0.1 C | Cycle-life characteristics (30CY/1CY, %) |
|---|---|---|---|---|
| Example 1 | 38:29:33 | 11.92 | 90.98 | 96.45 |
| Example 5 | 38:29:33 | 6.97 | 91.54 | 96.89 |
| Comparative Example 1 | 38:29:33 | — | 86.53 | 92.56 |
| Comparative Example 2 | 38:29:33 | — | 85.49 | 92.63 |
| Comparative Example 3 | 38:29:33 | 7.32 | 86.59 | 92.63 |
| Comparative Example 4 | 38:29:33 | 1.85 | 87.46 | 93.31 |

<Comparison of high rate and cycle-life characteristics of 38:29:33 Ni composite oxide>

TABLE 10

| | Ni:Co:Mn | Decrease ratio of residual Li (%) | High rate capability 3 C/0.1 C | Cycle-life characteristics (30CY/1CY, %) |
|---|---|---|---|---|
| Example 2 | 60:20:20 | 20.26 | 89.14 | 92.53 |
| Example 6 | 60:20:20 | 21.57 | 90.01 | 94.01 |
| Comparative Example 5 | 60:20:20 | — | 79.23 | 86.25 |
| Comparative Example 6 | 60:20:20 | — | 80.78 | 87.85 |
| Comparative Example 7 | 60:20:20 | 8.51 | 82.96 | 90.22 |
| Comparative Example 8 | 60:20:20 | 4.26 | 83.54 | 91.25 |

<Comparison of high rate and cycle-life characteristics of 60:20:20 Ni composite oxide>

TABLE 11

| | Ni:Co:Mn | Decrease ratio of residual Li (%) | High rate capability 3 C/0.1 C | Cycle-life characteristics (30CY/1CY, %) |
|---|---|---|---|---|
| Example 3 | 70:15:15 | 55.17 | 88.54 | 91.83 |
| Example 7 | 70:15:15 | 51.63 | 88.89 | 92.03 |
| Comparative Example 9 | 70:15:15 | — | 78.24 | 83.25 |
| Comparative Example 10 | 70:15:15 | — | 81.01 | 84.85 |
| Comparative Example 11 | 70:15:15 | 16.18 | 83.14 | 86.22 |
| Comparative Example 12 | 70:15:15 | 0 | 83.54 | 85.25 |

<Comparison of high rate and cycle-life characteristics of 70:15:15 Ni composite oxide>

TABLE 12

| | Ni:Co:Mn | Decrease ratio of residual Li (%) | High rate capability 3 C/0.1 C | Cycle-life characteristics (30CY/1CY, %) |
|---|---|---|---|---|
| Example 4 | 80:10:10 | 57.59 | 86.26 | 90.23 |
| Example 8 | 80:10:10 | 40.47 | 88.26 | 90.55 |
| Comparative Example 13 | 80:10:10 | — | 76.85 | 80.14 |
| Comparative Example 14 | 80:10:10 | — | 75.10 | 81.11 |
| Comparative Example 15 | 80:10:10 | 20.51 | 81.24 | 85.69 |
| Comparative Example 16 | 80:10:10 | 12.53 | 82.17 | 85.99 |

<Comparison of high rate and cycle-life characteristics of 80:10:10 Ni composite oxide>

As shown in the above results, nickel composite oxides having a tunnel having a hollow structure despite different contents of nickel showed simultaneously improved power and cycle-life characteristics when coated with Al, B, and the like than when not coated therewith according to the comparative examples.

The reason is that the coating layer had a larger area extended inside of a core, thus ion conductivity materials of lithium boron oxide (LBO) and lithium aluminum oxide (LAlO) formed by residual Li and a coating element were distributed in a larger area, and resultantly, high rate capability and cycle-life characteristics of the cells were improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A nickel-based composite oxide for a lithium secondary battery, comprising:
   a core part; and
   at least one tunnel connected from the inside of the core part to the outside thereof,
   wherein the tunnel has a diameter of 100 nm or larger, and the composite oxide further includes coating layers located inside the tunnel and outside the core part.

2. The nickel-based composite oxide for a lithium secondary battery of claim 1, wherein a hollow part disposed inside of the core part is further included.

3. The nickel-based composite oxide for a lithium secondary battery of claim 2, wherein a diameter of the hollow part is 100 nm or larger.

4. The nickel-based composite oxide for a lithium secondary battery of claim 2, wherein the hollow part is connected with the tunnel at the inside of the core part.

5. The nickel-based composite oxide for a lithium secondary battery of claim 2, wherein the coating layer is disposed inside of the hollow part.

6. The nickel-based composite oxide for a lithium secondary battery of claim 1, wherein the coating layer includes one or more of B (boron), Al (aluminum), Si (silicon), W (tungsten), Ga (gallium), In (indium), and Sn (tin) as coating element.

7. The nickel-based composite oxide for a lithium secondary battery of claim 6, wherein the coating element includes B (boron).

8. The nickel-based composite oxide for a lithium secondary battery of claim 7, wherein an amount of B distributed in the coating layer is 0.3 wt % or less relative to a total amount of the nickel-based composite oxide.

9. The nickel-based composite oxide for a lithium secondary battery of claim 6, wherein the coating element includes Al (aluminum).

10. The nickel-based composite oxide for a lithium secondary battery of claim 9, wherein an amount of Al distributed in the coating layer is 0.5 wt % or less relative to a total amount of the nickel-based composite oxide.

11. The nickel-based composite oxide for a lithium secondary battery of claim 1, wherein the core part includes a compound represented by Chemical Formula 1:

$$Li_{1+x}Ni_aCo_bM_cM'_dO_2 \quad \text{[Chemical Formula 1]}$$

wherein, in Chemical Formula 1,
x is ±0.05,
0.3≤a≤0.8,
0<b≤0.4,
0<c≤0.4,
0≤d≤0.05,
M is one or more selected from Mn and Al, and
M' is one or more selected from Ti, Zr, Mg, and Ca.

12. The nickel-based composite oxide for a lithium secondary battery of claim 1, wherein the coating layer includes a lithium compound produced from a reaction of a coating element in the coating layer with residual lithium of the core.

13. The nickel-based composite oxide for a lithium secondary battery of claim 1, wherein the coating layer includes $LiBO_2$, $LiB_3O_5$, $LiAlO_2$, or a combination thereof.

14. The nickel-based composite oxide for a lithium secondary battery of claim 1, wherein an amount of residual lithium in the nickel-based composite oxide is 0.2% or less based on TTL (total lithium).

15. A lithium secondary battery comprising:
a positive electrode including the nickel-based composite oxide for a lithium secondary battery of claim 1;
a negative electrode including a negative active material; and
an electrolyte.

* * * * *